United States Patent

[11] 3,627,078

| [72] | Inventor | James C. Burrous Cupertino, Calif. |
|---|---|---|
| [21] | Appl. No. | 88,558 |
| [22] | Filed | Nov. 12, 1970 |
| [45] | Patented | Dec. 14, 1971 |
| [73] | Assignee | Lockheed Aircraft Corporation Burbank, Calif. |

[54] ROTARY LIQUID PICKUP
7 Claims, 5 Drawing Figs.

[52] U.S. Cl. ................................................ 184/6.2, 137/44
[51] Int. Cl. ..................................................... F01m 11/06
[50] Field of Search ........................................... 184/6.2; 137/44, 45; 244/135 R

[56] References Cited
UNITED STATES PATENTS

| 1,845,136 | 2/1932 | Dieter | 244/135 R |
| 2,183,034 | 12/1939 | Voit et al. | 184/6.2 X |
| 2,245,198 | 6/1941 | Hunter et al. | 244/135 R X |
| 2,364,119 | 12/1944 | Anderson | 184/6.2 X |
| 2,399,323 | 4/1946 | Chester | 184/6.2 X |
| 2,662,538 | 12/1953 | Cervino | 137/45 |
| 2,765,866 | 10/1956 | Carroll, Jr. et al. | 137/45 X |
| 2,835,263 | 5/1958 | Klank, Jr. | 137/45 |

*Primary Examiner*—Manuel A. Antonakas
*Attorneys*—Paul F. Morgan and George C. Sullivan ABSTRACT: An improvement in liquid pickup systems for drawing liquid from a tilting vehicular liquid reservoir. A pickup member is mounted to rotate within the reservoir by gravitational force when the reservoir is tilted, and an eccentrically mounted unbalancing member integral therewith provides positive rotation of the pickup member. The unbalancing member has a density substantially less than the density of the normally submerged portion of the pickup member so as to provide a substantial shift in the position of the gravitational force acting on the pickup member as the unbalancing member changes from a submerged to a nonsubmerged state.

Patented Dec. 14, 1971
3,627,078
2 Sheets-Sheet 1
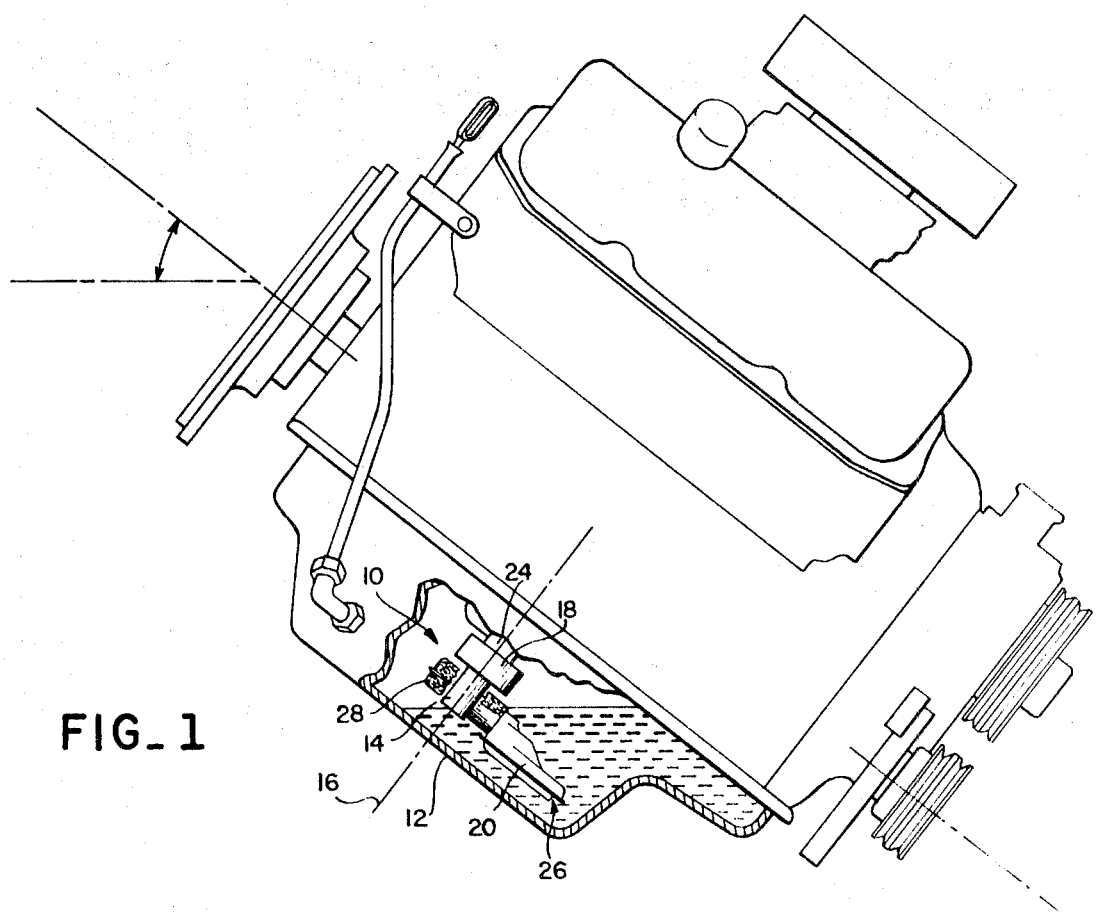
FIG_1
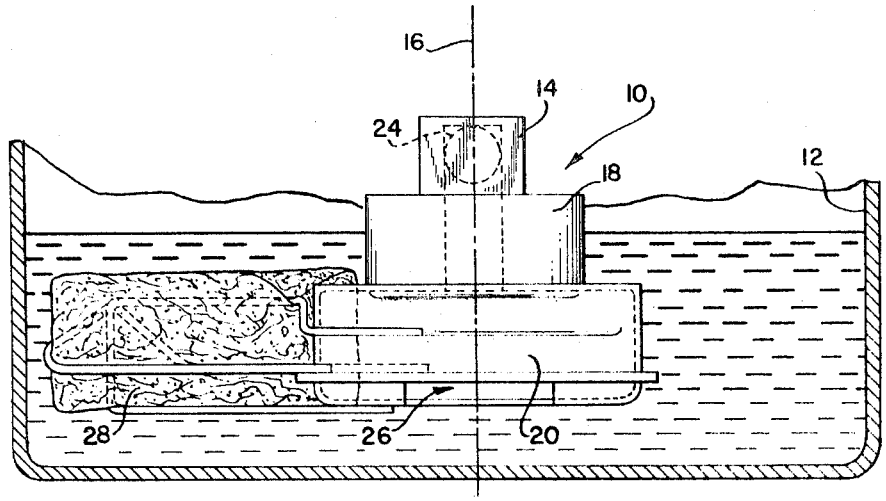
FIG_2
INVENTOR.
JAMES C. BURROUS
BY George C. Sullivan, agent
Paul F. Morgan
Attorney Patented Dec. 14, 1971 3,627,078
2 Sheets-Sheet 2
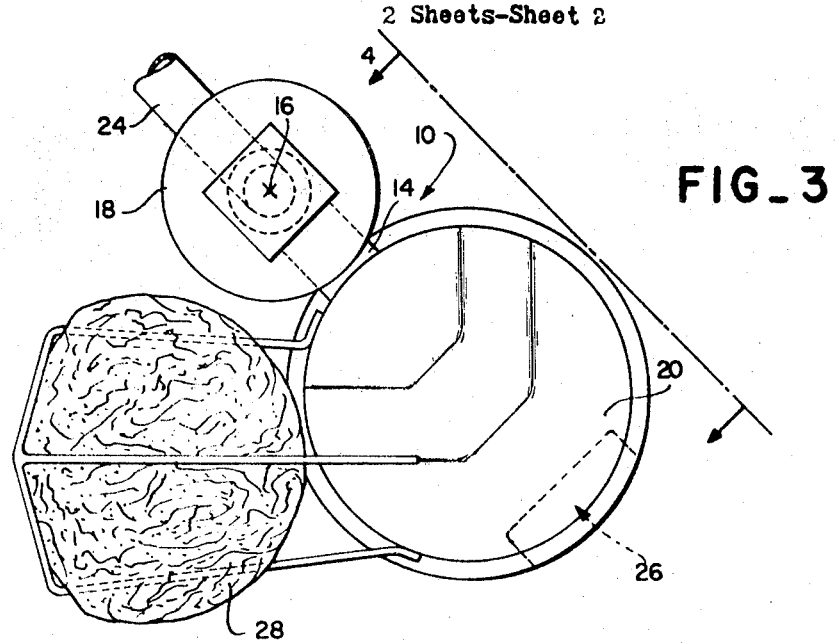
FIG_3
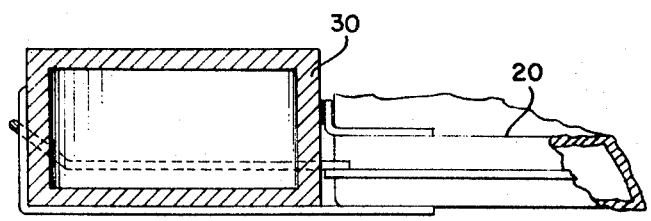
FIG_5
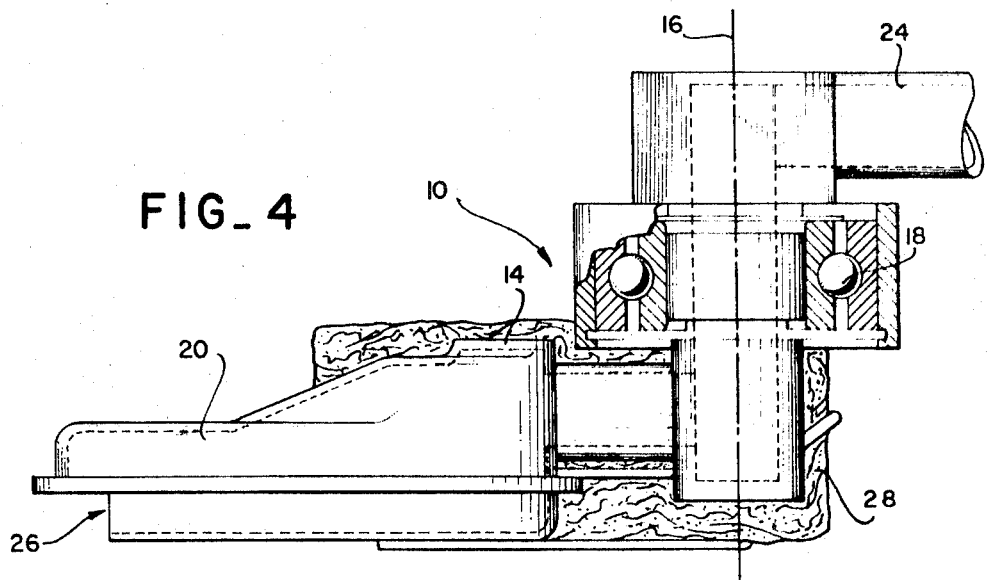
FIG_4
INVENTOR.
JAMES C. BURROUS
BY George C. Sullivan, agent
Paul F. Morgan
Attorney

ROTARY LIQUID PICKUP

The invention herein described was made under a contract with the Department of the Army.

The present invention relates to a liquid pickup system for ensuring that liquid is drawn from a reservoir regardless of the tilting of the liquid level therein. An automatic unbalancing arrangement ensures positive rotation of the pickup member into the liquid regardless of the direction in which the reservoir is tilted.

In a vehicle subjected to large angular movements there is a corresponding large shifting of the liquid level in the liquid reservoirs in the vehicle, such as the engine oil sump. Since the liquid must be drawn substantially continuously, irrespective of the degree of roll or tilt of the liquid reservoir, a single fixed position liquid intake is normally not sufficient for such vehicles. Various prior art arrangements have been developed employing a rotatable liquid pickup member which is rotated by gravitational force when the vehicle tilts so as to follow and remain immersed in the liquid. The following U.S. Pat. are exemplary of such arrangements: Nos. 2,183,034, 2,364,119, 2,662,538 and 2,835,263. Various other arrangements with weights, or fins to utilize oil movement, have been attempted but have not worked satisfactorily.

A serious deficiency with such prior art rotatable liquid pickup systems is the fact that the vehicle's transition in roll or pitch is often directly along a 180° axis. Since the necessary force for rotation of the pickup member is provided by its unbalanced weight about its axis of rotation, and since this force acts directly through this axis of rotation if the vehicle tilts through the horizontal on a 180° axis, the pickup member can be "hung-up" by even very small frictional forces. This leaves the pickup member out of the liquid, 180° out of its proper position, and therefore renders it ineffective.

This problem is discussed, for example, in the referenced U.S. Pat. No. 2,835,263. This patent discloses a prior art attempt to overcome the problem by a rolling ball mechanism intended to move so as to cause the pickup member to rotate into its proper position. Such arrangements, however, have the obvious disadvantage that the balls or other such moving parts introduce a substantial response time and are subject to sticking and being prevented from proper operation by any contamination in the liquid. In oil sumps, for example, sludge and other common contaminants readily interfere with such mechanical arrangements.

The present invention provides a pickup member with positive means for unbalancing and forceably rotating a pickup member into its desired lowermost (immersed) position without requiring any additional moving parts or mechanisms. The pickup member of the invention assumes a proper lowermost position when immersed in the liquid, yet when the vehicle is tilted a gravitational force is automatically provided thereon which does not act through the center of rotation of the pickup member, and therefore the pickup member is not subject to "hanging up" as discussed above. This important advantage is provided without any substantial increase in size or complexity over conventional liquid pickup systems.

Further objects, features and advantages of the invention pertain to the particular arrangement and structure whereby the above-mentioned aspects of the inventions are attained. The invention will be better understood by reference to the following description and to the drawings forming a part thereof, which are substantially to scale, wherein:

FIG. 1 is an exemplary liquid pickup system in accordance with the present invention shown operating inside the oil sump of a conventional engine in a tilted position;

FIG. 2 is a frontal view of the oil pickup system of FIG. 1, showing, however, the oil sump and the liquid therein in its normal horizontal position;

FIG. 3 is a top view of the oil pickup system of FIGS. 1 and 2;

FIG. 4 is a side view, partially broken away, of the oil pickup system of FIGS. 1–3; and FIG. 5 is an alternative embodiment of the liquid pickup system of FIGS. 1–4 having a different unbalancing member thereon.

Referring first to FIGS. 1–4, there is shown therein an exemplary liquid pickup system 10 for continuously drawing liquid from a variably tilting liquid vehicular reservoir 12, exemplified in this case by a conventional internal combustion engine oil sump. A pickup member 10 is mounted for 360° planar rotation within the reservoir 12 by the gravitational force acting thereon when the reservoir 12 is tilted. This rotation is here about a vertical axis 16 at a bearing 18. The gravitational force for rotation is provided by the fact that the center of gravity of the pickup member 14 is substantially horizontally spaced from the vertical axis of rotation 16 about which the pickup member rotates.

The pickup member 14 has a liquid intake member 20 which draws the liquid from the reservoir therethrough to an outlet 24, from whence in this case it is conducted to the vehicle oil pump. The liquid outlet 24 is fixed in this case to the engine block at the axis 16 and therefore provides the mounting of the pickup system 10. The only moving part required in the liquid system 10 is the pickup member 14.

The above-described aspects of the pickup member 14 and liquid reservoir 12 may be generally conventional and therefore may not be described in detail. As the liquid reservoir 12 is tilted, the entire pickup member 14 rotates and the intake member 20 rotates into the liquid and draws liquid therein through an intake opening 26 in its outer extremity.

By "intake member" throughout is meant that portion of the pickup member which is normally submerged beneath the liquid level and extends from the axis of rotation. The intake member 14 has a high specific gravity, and is preferably constructed of steel or other heavy metal, so as to overcome any buoyancy effect of the liquid when submerged and continue to rotate by its weight through the liquid to hang beneath the axis of rotation.

The pickup member 14 includes an integral unbalancing member 28. The unbalancing member 28 here is a separate component fastened to one side of the intake member 20. The unbalancing member 28 is normally submerged in the liquid in the reservoir, i.e., it is submerged unless the liquid reservoir is substantially tilted. It is fixed in spaced position with respect to intake member 20 and rotates therewith.

The unbalancing member 28 extends horizontally away from the intake member 20 substantially at right angles to the line extending between the intake member 20 and the axis of rotation 16, substantially spaced from the axis 16. As may be seen particularly from FIG. 3, the center of the unbalancing member 28 is preferably located approximately 90° from the center of the intake member 20 about the axis of rotation 16.

The maximum eccentric extension of the unbalancing member 28 away from the liquid intake member 20 and the axis 16 is limited by the fact that the entire pickup member 14, including the unbalancing member 28, must be free to swing in a circle no greater in dimensions than the interior walls of the liquid reservoir 12.

This difference is density between the unbalancing member 28 and the intake member 20 may be provided by constructing them from two different materials with different densities, or by providing a hollow buoyancy chamber in the unbalancing member as illustrated in the alternative embodiment of FIG. 5. The unbalancing member 28 shown in FIGS. 1–4 is a large but very lightweight biscuit of reticulated plastic foam retained by an enclosing wire cage welded to one side of the intake member 20. A suitable material is Scottfoam type ZF MIL-B-83054 made by the Scott Paper Company, Foam Division, Chester, Pennsylvania. This foam biscuit is porous and absorbent and when submerged in the liquid in the reservoir 12 it substantially completely fills with the liquid. Thus, since its own weight is insignificant, the specific gravity of the submerged unbalancing member 28 is substantially identical to that of the liquid in the reservoir 12. Accordingly, the unbalancing member 28, when submerged, has no significant gravitational or buoyancy effect compared to the intake member 20. The center of gravity of the submerged pickup member 14 is effectively that of intake member 20 alone. When both the unbalancing member 28 and the intake member 20 are submerged the unbalancing member 28 has no appreciable effect on the movement and positioning of the intake member 20; i.e., the substantial weight of the intake member 20 pulls the entire pickup member 14 into the desired lowermost position. (The intake member 20 hangs directly underneath the axis 16.)

When, however, the vehicle tilts, so that the liquid in the reservoir 12 begins to run to the opposite end of the reservoir and leave the pickup member 14 exposed the unbalancing member 28 is then exposed above the level of the liquid. When this happens there is an immediate shifting of the effective center of gravitational force on the pickup member 14. This is because the substantial weight of the liquid retained in the foam biscuit is no longer balanced out by being submerged in the liquid. This unbalanced weight of the exposed unbalancing member 28 is a substantial percentage of the weight of the intake member 20 and has a substantial gravitational force effect on the pickup member 14. In contrast, the intake member 20, being constructed of a much denser material, and not having been balanced by buoyancy forces when submerged, does not substantially increase its gravitational force effect on the pickup member 14 when it is lifted out of the liquid. This results in an immediate automatic shifting of the effective center of gravitational force away from the center of the intake member toward the unbalancing member, thereby providing a positive rotational force (torque) upon the pickup member 14, regardless of the direction of vehicle tilt; i.e., even if that direction of tilt is along the line between the center of gravity of the intake member 20 and the axis of rotation 16. Thus, positive rotation of the pickup member 14 to hold the intake member 20 in its submerged position is ensured without requiring any moving parts or change in position for the unbalancing member 28. Unlike the referenced prior art pickup members there is always a force available to overcome the swivel friction and to swing the pickup member around.

Once the unbalancing member 13 has started the pickup member 14 to rotate, the center of gravity of the intake member 20 then acts offset the axis of rotation 16, and therefor rotation will continue due to the weight of the intake member 20 until member again reaches its proper position.

While the unbalancing member 28 of FIGS. 1-4 is a foam construction and utilizes the weight of the liquid retained therein, it will be appreciated that a solid plastic or light metal body of similar weight and specific gravity may also be utilized to provide the same function. Also, FIG. 5 illustrates an alternative embodiment in which the unbalancing member 28 replaced by metal unbalancing member 30 at the same location with a sealed hollow buoyancy chamber therein to provide corresponding overall weight and density characteristics. It will be appreciated that the unbalancing member can be provided as an integral part of the pickup member 14 in any number of suitable or conventional ways and that the arrangement disclosed herein is merely exemplary.

The apparatus disclosed herein has been successfully installed and operated in specialized ground vehicles. It has enabled these vehicles to operate up and down 45° grades without lubrication stoppages; i.e., without interruption of the pickup of oil from the engine oil sumps. It will be appreciated that the apparatus of the invention may be utilized to solve similar problems in various other vehicular liquid reservoirs, such as reservoirs for lubricants or fuels in various land, sea or air vehicles where substantial movement of the level of the liquid in the container presents problems in its continuous removal.

While the apparatus described wherein is presently considered to be preferred, it is contemplated that further modifications and improvements well within the purview of those skilled in the art may be made herein. The following claims are intended to cover all such variations and modifications as fall within the true spirit and scope of the invention.

What is claimed is:

1. In a liquid pickup system for drawing liquid from a variable tilting liquid vehicular reservoir the improvement comprising:
   a pickup member having a liquid intake member and a liquid outlet,
   said pickup member being mounted to rotate within said liquid reservoir by gravitational force acting thereon when said reservoir is tilted,
   said liquid intake member being normally submerged in the liquid in said reservoir and being adapted to draw liquid from said reservoir to said liquid outlet,
   said liquid intake member having a first density;
   and an unbalancing member integral with said pickup member,
   said unbalancing member being normally submerged in said liquid in said reservoir and having a second density substantially less than said first density of said liquid intake member;
   said unbalancing member extending eccentrically substantially away from said liquid intake member to provide a substantial shift in the position of the gravitational force acting on said pickup member as said unbalancing member changes from a submerged to an unsubmerged state in the liquid due to tilting of the reservoir.

2. The liquid pickup system of claim 1 wherein said unbalancing member is a plastic body having a specific gravity several times less than the specific gravity of said liquid intake member.

3. The liquid pickup system of claim 1 wherein said unbalancing member is a porous liquid retaining body.

4. The liquid pickup system of claim 1 wherein said unbalancing member is a metal body with a hollow buoyancy chamber therein to provide a low total specific gravity.

5. The liquid pickup system of claim 1 wherein said unbalancing member has a specific gravity of approximately one and said liquid intake member is metallic and has a specific gravity substantially greater than one.

6. The liquid pickup system of claim 1 wherein said pickup member is rotatable about said liquid outlet and wherein said unbalancing member extends substantially at right angles to a line extending between said liquid intake member and said liquid outlet, adjacent said liquid intake member.

7. The liquid pickup system of claim 6 wherein said unbalancing member has a specific gravity of approximately one and said liquid intake member is metallic and has a specific gravity substantially greater than one.

* * * * *